Figure 1:
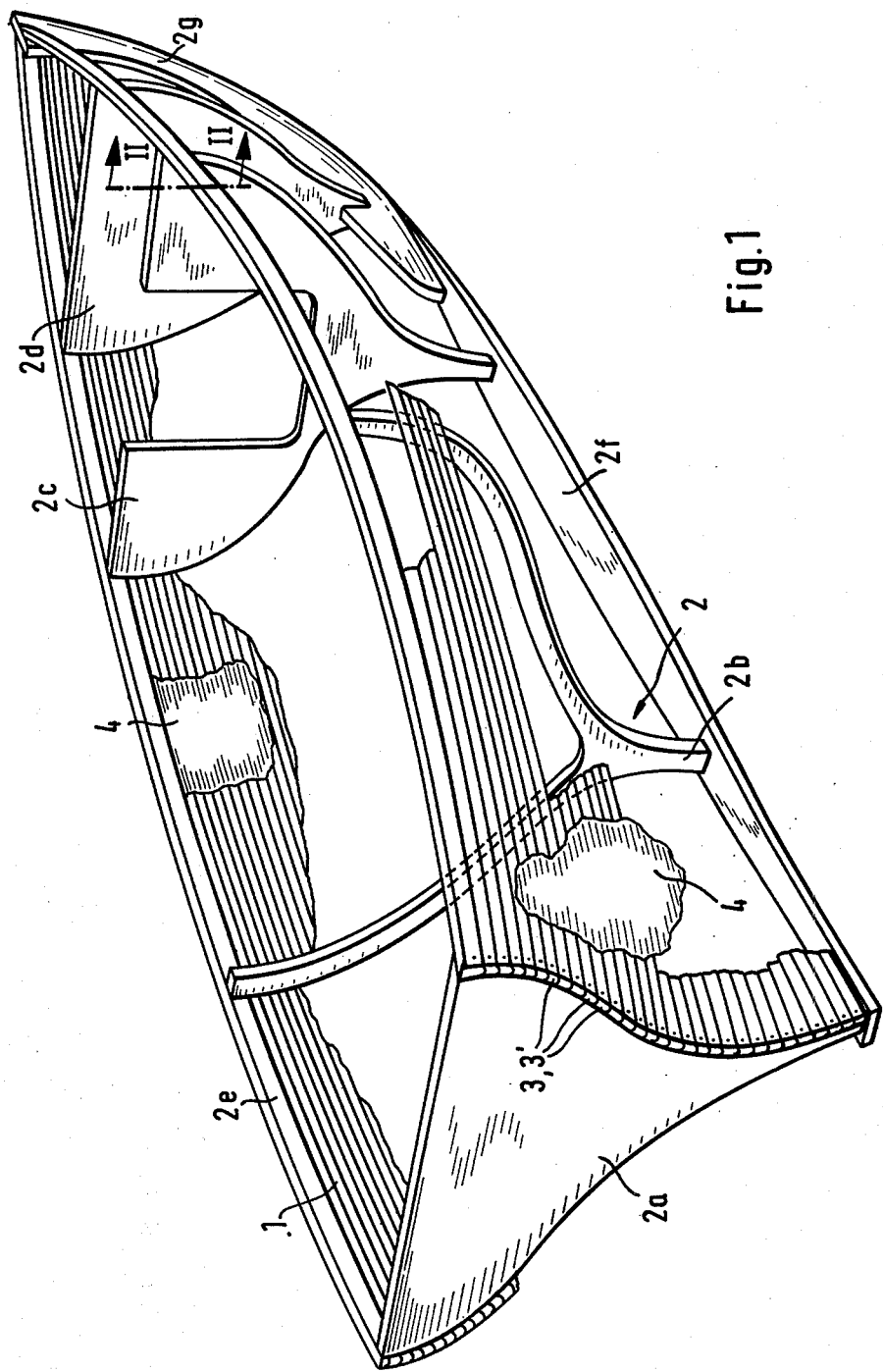

United States Patent [19]

Pfleger

[11] 4,142,265

[45] Mar. 6, 1979

[54] PLASTICS BOAT HULL

[76] Inventor: Albert Pfleger, Wachterstrasse 19, D-8170 Bad Tolz, Fed. Rep. of Germany

[21] Appl. No.: 805,170

[22] Filed: Jun. 9, 1977

[30] Foreign Application Priority Data

Jun. 14, 1976 [DE] Fed. Rep. of Germany ....... 2626537

[51] Int. Cl.² .............................................. B63B 3/00
[52] U.S. Cl. ..................................... 9/6 P; 156/250; 156/268; 156/303.1; 425/385
[58] Field of Search ................. 9/6 P, 6 W; 156/250, 156/268, 303.1, 305; 264/261, 294, 293, 320, 322, 323, 138; 425/385

[56] References Cited

U.S. PATENT DOCUMENTS

| | | | |
|---|---|---|---|
| 2,743,465 | 5/1956 | Vogel | 9/6 W |
| 2,905,579 | 9/1959 | Sumner | 9/6 W X |
| 3,093,847 | 6/1963 | Strecker | 9/6 P |
| 3,344,007 | 9/1967 | Skoggard | 9/6 P X |
| 3,689,339 | 9/1972 | Klinger | 156/303.1 X |

Primary Examiner—Trygve M. Blix
Assistant Examiner—Sherman D. Basinger
Attorney, Agent, or Firm—Blanchard, Flynn, Thiel, Boutell & Tanis

[57] ABSTRACT

This invention relates to a self-supporting plastics shell construction, particularly to a multilayered boat shell constructed of elongate thermoplastic shapes disposed in a form-locking arrangement adjacent one another in the shape of a basic shell and covered with laminates of fiber-reinforced thermosetting plastics, and further concerns a method for producing such plastics shell construction with the aid of a form frame determining the final shape.

28 Claims, 13 Drawing Figures

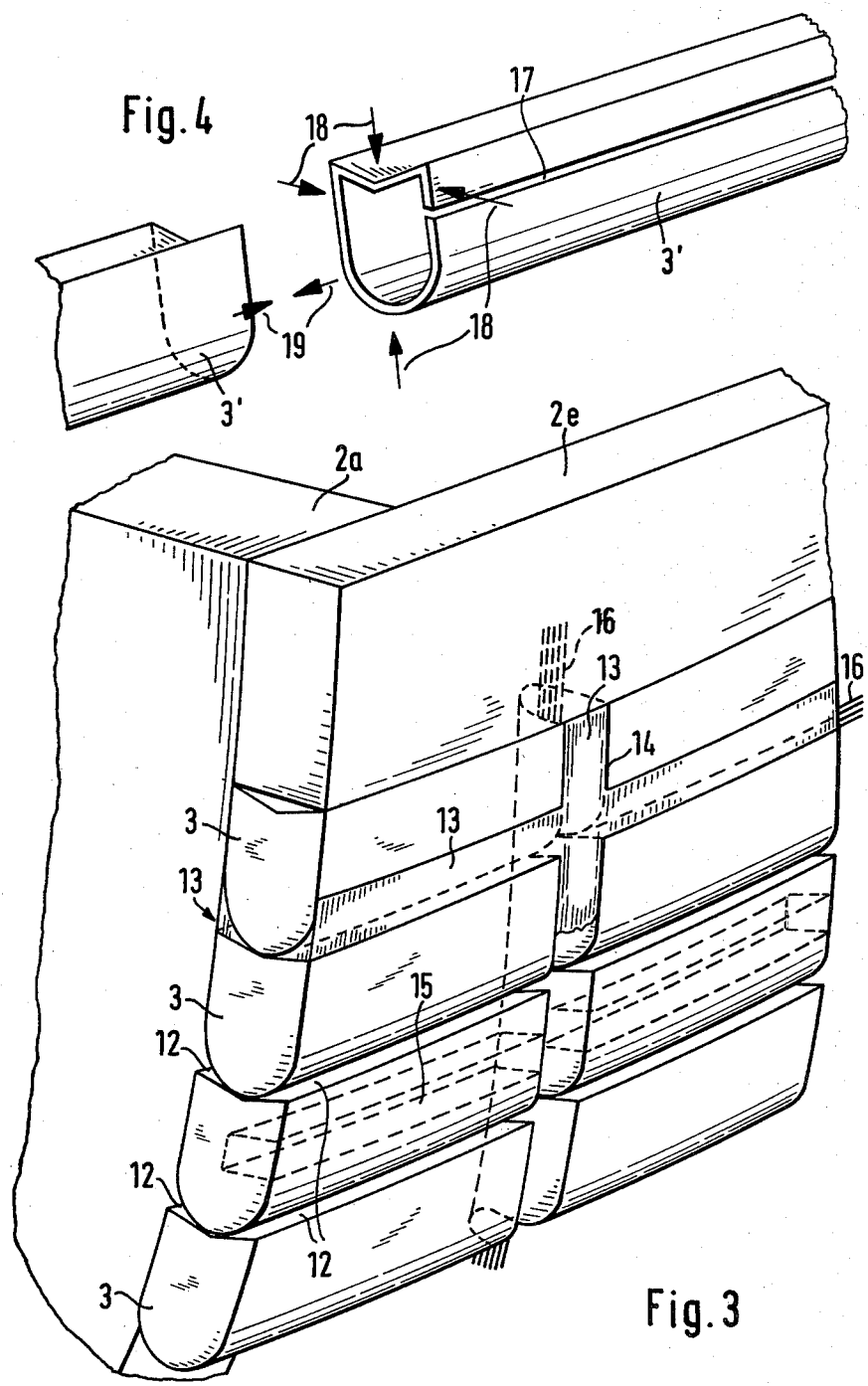

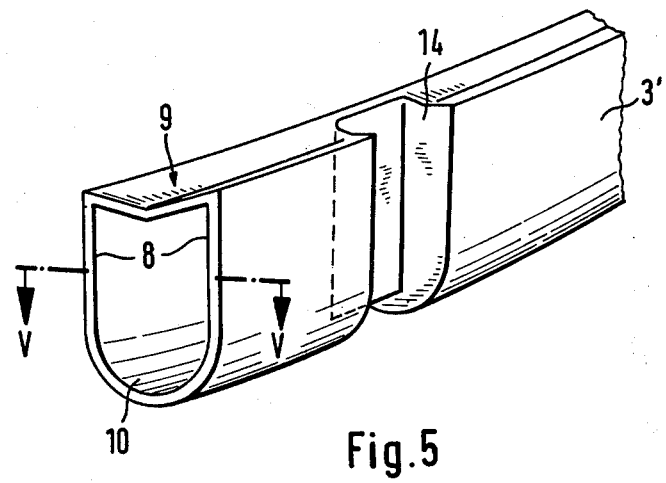
Fig.5
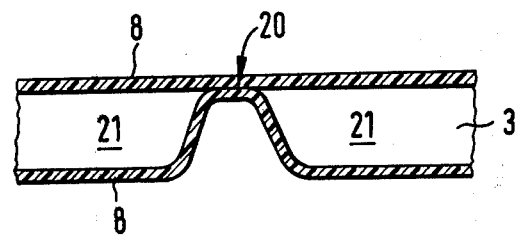
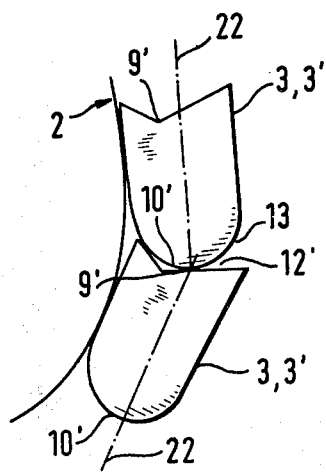
Fig.6

PLASTICS BOAT HULL

A known type of boat hull shell is constructed as a sandwich structure of individual foam plastics plates, with their butt joints sealed with a filler and their surfaces covered with fiber-reinforced thermosetting plastics laminates. The forming frame employed in this case is a positive core which is removed after the outer laminate has become set, so that the interior surfaces can also be covered with a laminate. The assembly of the positive core and the time-consuming manufacturing process result in high production costs of such boat hull shells. In addition, there are further operations required to provide the basic shell with other structural parts such as bulkheads, decks, and superstructures.

Another known type of boat shells is produced with the aid of a negative form by first applying the eventual outer skin, or varnish coat, respectively, of the boat hull to the glazed or polished interior wall surface of the form, and then applying a sufficient number of layers of a glass fiber reinforced thermosetting plastics laminate to obtain a fully-laminated shell having sufficient self-supporting strength. Also in this case, further installations and additional interior stiffeners are required to obtain a self-supporting boat hull shell. The fabrication of such negative forms, which have to be very stable, is very expensive. Further a non-separable negative form of this type is unsuitable for forming boat shells having reentrant ribs, a reentrant stern frame, or possibly a negative deck jump. In addition, a negative form of this type has to remain occupied for a long period of time for allowing the shell to become set, whereby the profitability of this production method is put into question, particularly in the case of smaller boatbuilding enterprises.

Further known are self-supporting plastics shells of the initially-named type, particularly for employ in the building and sanitary installations fields, consisting of individual thermoplastic shapes having in most cases a circular or rounded cross section. The shapes are placed side by side in direct contact with one another or with spacer elements for providing a three-dimensional curvature of the finished shell inserted therebetween, and embedded between laminates of glass fiber reinforced thermosetting plastics. A substantial excess of the thermosetting plastics material is provided for filling the unavoidable interstices or grooves between individual shapes and for obtaining a highly form-retaining finished structure in connection with the laminates. Due to its design and method of construction, a shell of this type has insufficient form-retaining strength for employ as a boat hull. A self-supporting boat hull shell can only be obtained by integrating additional stiffening structural element commonly employed in boatbuilding.

It is an object of the invention to provide a self-supporting boat hull shell also for bigger boats, which is extremely light and particularly shape-retaining in its wall portions, and to propose a method for profitably producing such boat hull shells at minimum construction expense.

For attaining this object, the invention provides that the basic shell consists of elongate flexible shapes having a uniform cross section and forming outwardly opening longitudinal grooves along their areas of mutual contact, that the longitudinal grooves are filled with a thermosetting filler material, and that the so-formed basic shell surfaces are covered with laminates of fiber-reinforced thermosetting plastics.

A boat hull shell of this type comprises particularly longitudinally effective stiffeners formed by the thermosetting filler material filling the longitudinal grooves below the outer laminates.

For further enhancing the shape-retaining properties of a boat hull shell, a particular embodiment of the invention provides that the surfaces of the basic shell have embossed therein further grooves extending transversely i.e. perpendicularly or obliquely to the direction of the longitudinal grooves, that these grooves are filled with a thermosetting filler material, and that the so-formed basic shell surfaces are covered with laminates. In this manner, the boat hull shell comprises an integral stiffening framework formed of longitudinally and transversely extending cords of said thermosetting filler material and adapted to absorb high loads in the longitudinal and transverse directions as well as strong warping forces.

In a further embodiment of the boat hull shell according to the invention, the surface of the basic shell is empossed with further grooves in the shapes extending parallel to the longitudinal grooves, the longitudinal grooves, the transverse grooves and the additional grooves are filled with a thermosetting filler material, and the so-formed surfaces are covered with laminates. The stiffening framework thus formed by intersecting cords of thermosetting filler material confers very good shape-retaining properties to the boat hull shell of this embodiment, which may therefore be used as a warp-resistant, rugged shell also for bigger boats.

In a further embodiment of a boat hull shell the invention provides that openings or cutouts in the form of flutes, grooves, channels or recessed areas extending from one shape wall up to the opposite shape wall are milled or cut in the basic shell, filled with a thermosetting filler material, and covered with laminates at the surface of the basic shell.

The filler material introduced in these openings or cutouts forms a particularly solid connection with the shapes as it partially penetrates into the cavities thereof prior to becoming set. In addition, these areas are particularly shape-retaining and stiffened, since the thus-integrated filler material is homogenuously linked with the outer laminate.

In an advantageous embodiment of the boat hull shell according to the invention, even more effective stiffening is provided by removing both shape walls in the area of the openings or cutouts, filling said openings or cutouts with filler material, and covering them with laminates at both surfaces of the basic shell. In this case, the very strong and dense mass of the filler material forms rigid webs in the boat hull shell homogenuously linked with the laminates on both surfaces of the basic shell. In the respective areas, the walls of the soft thermoplastic shapes are completely removed. The optical impression of a smooth surface of the boat hull is nevertheless retained, since the location of the rigid webs of solid thermosetting filler material is not visible from the outside. These areas may preferably be employed for fastening fittings, enabling very high loads to be introduced into the boat hull through the thermosetting filler material. In another aspect, these webs divide the hollow shapes into separate hermetically sealed chambers, with their sealing effect unimpaired by any fastening elements for the fixtures anchored in the filler material.

In a preferred embodiment of the boat hull shell according to the invention, the filler material filling said grooves has reinforcements embedded therein. These reinforcements are applied in an intersecting pattern and may be intertwined, knotted or interwoven at their points of intersection, so that they are extremely well suited to absorb any warp forces and tension loads applied to the boat hull shell, whereby said boat hull shell has shape-retaining properties otherwise found only in boat hulls with structurally expensive stiffening elements.

Boat hull shells according to the invention may be produced particularly profitable and also by relatively unskilled personell by applying the following production method of the invention with the aid of a form frame determining the final shape of the boat hull shell. Such method according to the invention is characterized in that the shapes are applied to said form frame with their longitudinal sides engaging one another, affixed to said form frame at individual points, and clamped together in sections to form said basic shell, specifically forming said longitudinal grooves along their mutually engaging longitudinal sides, before said thermosetting filler material is introduced into said longitudinal grooves and the so formed surfaces are covered and thereby linked with said fiber-reinforced thermosetting plastics laminate.

In order to provide a boat hull shell having a stiffening frame consisting of longitudinal and transverse cords, the invention provides that prior to filling said longitudinal grooves, the surfaces of the basic shell are embossed with a plurality of grooves extending transversely e.i. perpendicularly or obliquely to the longitudinal direction of the shapes by means of a heated embossing tool, and that the grooves are subsequently filled with a thermosetting filler material.

Since in certain cases a boat hull shell according to the invention is to be provided with additional, longitudinally stiffening cords in areas subjected to particularly high loads, the method according to the invention further provides that additional longitudinal grooves are embossed in the shapes, and that the grooves are then simultaneously filled with a thermosetting filler material.

In an advantageous embodiment of the inventive method, the surface of the basic shell may be cut out or milled down to the opposite wall of the shapes, and the so formed flutes, grooves, channels or cutout areas filled with a thermosetting filler material prior to applying the covering laminates.

This process step is readily accomplished with the aid of conventional milling or cutting machines and results in stiffening webs dividing the shapes into separately sealed sections. The filling material penetrates into a part of the shapes' cavities and provides a good sealing effect. After becoming set, the filler material filling these areas forms solid anchoring points for fittings or other elements of the boat hull. The openings or cutouts may be milled or cut from the outside or the inside of the boat hull shell, as desired.

In a slightly modified embodiment of the method according to the invention it may be convenient to apply a laminate to one surface of the basic shell, and to remove both walls of the shapes by milling or cutting from the opposite surface, whereupon the so formed cutout is filled with a filler material and covered with a laminate.

The first-named laminate acts as a supporting layer during cutting or milling and subsequent filling of the so formed recess. After filling of the recesses and covering the other surface of the basic shell with the laminate, the boat hull shell is formed with very stiff transverse webs which may serve as integral ribs. It is also possible, of course, to bolt the ribs provided in the interior of the boat hull shell to these areas, since the homogenuous integrated ribs of hardened thermosetting filler material provide for a better anchoring of the fastening elements than the compound body formed of the thermoplastic material of the shapes and the thermosetting filler material.

In a further embodiment of the inventive method, resulting in substantially improved shape-retaining properties of the produced boat hull shell, the invention provides that reinforcements of carbon fibers, plastics fibers, glass fibers, glass fiber rovings or metal having a high tensile strength are embedded in the filler material for the grooves. Such reinforcements are suitably in the form of strips, ribbons, cords, rods, tubes, shapes and the like. The employed reinforcing material, or the form of the reinforcement, respectively, is to be matched to the loads to be expected for the boat hull shell produced. Obviously mixtures of different materials or mixtures of different materials in different forms may also be employed. It is thus possible, for instance, to employ different types of reinforcements in the longitudinal and transverse or oblique directions of the hull.

For the performance of the method according to the invention for producing self-supporting boat hull shells it is advantageous to employ shapes of uniform section having two substantially parallel lateral surfaces connected at their upper edges by a shallow V-shaped channel, and at their lower edges, by a U-shaped rounded bottom, so that each profile may have its bottom surface engaged with the channel of the adjacent shape, and one of its lateral surfaces with the form frame. This feature of the inventive method permit boat hull shells having various three-dimensional curvatures to be constructed in a simple manner, ensuring at all times that the longitudinal grooves for forming the stiffening frame for obtaining the required shape-retaining properties are formed between the shapes.

According to the invention it is also possible, however, to employ shapes in which the channel and the bottom surface are unilaterally offset with respect to the symmetry axis of the shape's section, and to employ shapes in which the height of the rounded bottom surface is greater than the depth of the V-shaped channel. Such shapes ensure in a simple manner that even in areas of extreme curvature of the boat hull shell there are formed longitudinal grooves for receiving the filler material and possibly, the reinforcements embedded therein, forming the stiffening frame for the boat hull shell.

Since the boat hull shell according to the invention has to be very light and should have good floating properties, and since the boat hull shells according to the invention may have strongly curved sections in the longitudinal direction which should also be perfectly shaped, the method according to the invention proposes to employ extruded tubular shapes which are divided into individual separate chambers on embossing the longitudinal and transverse grooves. In this case the transverse grooves, which are to be filled with the filler material and possibly, with the reinforcement, are embossed to such a depth that one sidewall of the shape section is engaged with the opposite sidewall and is possibly welded thereto to form a fluid-tight seal. The formation of such chambers ensuring sufficient buoyancy of the boat hull shell even in case of damage of the boat shell's skin is facilitated by the thermoplastic material of the tubular shapes. The opperartion of welding the sidewalls of the shapes together in the area of the transverse grooves may of course be facilitated by applying an adhesive to the interior surfaces of the shapes.

In another embodiment of the outlined method the invention provides that the tubular shapes are divided into individual, separately sealed chambers by the openings or cutouts filled with a thermosetting filler material. This leads to the formation of transverse ribs for stiffening the boat hull shell, with the filler material partially penetrating into the cavities of the shapes to become integrally locked therewith and providing a reliable sealing effect.

Storing and handling of the employed tubular shapes as well as the performance of the method according to the invention may be considerably facilitated, if the tubular shapes are assembled in the longitudinal direction of individual lengths by forming at least one longitudinal slit in one end of one such length, compressing the shape along the length of said slit, applying an adhesive thereto and introducing it into an end of an adjacent individual length. In this case the boatbuilder does not have to consider the length of available tubular shapes, but is able to assemble the shapes for any desired size of a boat hull shell.

According to a further feature of the method according to the invention, applicable in particular to facilitating the production of boat hull shells, it is proposed that at least one shape is clamped to the adjacent and already fastened shapes by means of at least one U-shaped assembly clamp adapted to be bent to the contour of that portion of the form frame to which the respective shape is to be attached, whereupon the clamped shape is affixed at predetermined points to the form frame and/or connected to the adjacent shape before the assembly clamps are removed. The assembly clamps may be formed of a resilient metal or plastics material. They may replace additional tools or helpers, so that a single boatbuilder is enabled to perform the method according to the invention.

Since the boat hull shell requires additional structures and provisions for being transformed into a servicable boat, which structures have to be adapted to the shape of the boat hull shell, and since a form frame determining the final shape is in any case required for performing the method according to the invention, it is proposed that the form frame consists of parts to be functionally integrated into the finished boat hull shell, such as ribs, bulkheads, transverse walls, stringers, keel, stern frame stem etc., which parts are operatively connected to the shell at areas of mutual contact. This feature serves to considerably lower the production costs of a boat built from the boat hull shell, and the time for building the boat is appreciably shortened.

In order to conform to these requirements, the invention provides that prior to beginning the assembly of the boat hull shell, at least two strips of reinforcing fiber fabric are applied to the edges of the form frame coming into contact with the shell, said strips projecting beyond said edges at both sides thereof and being provissionally attached to said form frame, and that during application of the laminate to the interior surface of the basic shell, said strips are laid down on the inside of the shell and connected in an overlapping manner to the laminate, or individual layers thereof, respectively, and that finally corner strips of reinforcing fiber fabric are glued into the thus formed inside corners.

As a further preferred feature of the method according to the invention it is proposed that the openings or cutouts filled with the thermosetting filler material are located at such portions of the basic shell provided for the later integration of the form frame elements, and that said elements are connected, preferably bolted, to such portions of the basic shell.

At these portions, the said elements are anchored very firmly to the boat hull shell, since the applied forces are absorbed only by the thermosetting filler material. The elements in this case may be selectively fastened from the inside or from the outside. By this feature it is also avoided that bolts or other fasteners penetrating into the cavities of the tubular shapes form leaks therein, through which condensed moisture or water from the outside might permeate between the shape walls.

In another embodiment the invention provides that the form frame is a reusable positive form core or a negative form shell to be removed subsequently. This modification of the method according to the invention is particularly suitable in cases in which the interior structures for the boat hull shell are fabricated at another location and are to be installed subsequently into the finished shell. The positive form core or the negative form shell may thus be employed for a series production of the boat hull shells according to the invention.

Since the overall optical impression is of particular importance for a modern boat hull shell, and since the cruising properties and the overall performance of a boat depend to a large extent on a faultless surface, particularly below the waterline, the method according to the invention is further characterized in that irregularities appearing on the surfaces of the basic shell are smoothed by hot ironing before the grooves are filled and possibly reinforced.

In a later stage of the method the invention provides that a deck structure consisting of juxtaposed shapes covered with laminates is mounted adjacent the stringers, with the laminate of the lower shell portions being extended without interruption to the laminate of the deck structure. The employ of the shapes also for the deck structure saves additional expensive materials and results in a lightweight deck structure improving the buoyancy of a boat and its stability with respect to the location of its center of gravity. The uninterrupted expanse of the laminate increases the resistance of the juncture between the boat hull shell and the deck structure against damage and intrusion of water.

Boats constructed with the boat hull shell according to the invention and by the method according to the invention are characterized by the following advantageous properties:

The boat hull shell has a resistant, lightweight and unsinkable skin of non-rotting plastics material.

In relation to its weight, the boat hull shell has exceptionally high strength against tensile forces, warp forces and impact loads.

The boat hull shell is constructed without the employ of expensive forms, lost auxiliary parts and expensive apparatus. Such boats may be profitably produced as individual designs as well as in a series production. The subsequent and mostly rather difficult installation of interior structures and fittings is for the major part anticipated by the construction method.

The boat hull shell and the deck structure are combined to form a seamless boat hull.

At a relative low weight, the structure of the boat hull shell has a high displacement of its own and comprises a considerable volume of entrapped air contributing to making the boat unsinkable.

Sound and thermal insulation values of the boat hull shell are at an optimum.

Boat hull shells of the type described are likewise suitable for extremely light, small boats as well as for ship's hulls of conditionally unlimited size.

The performance of the inventive method for producing a boat hull shell is diagrammatically represented in the drawings and described hereinafter with reference thereto.

Figure 2:
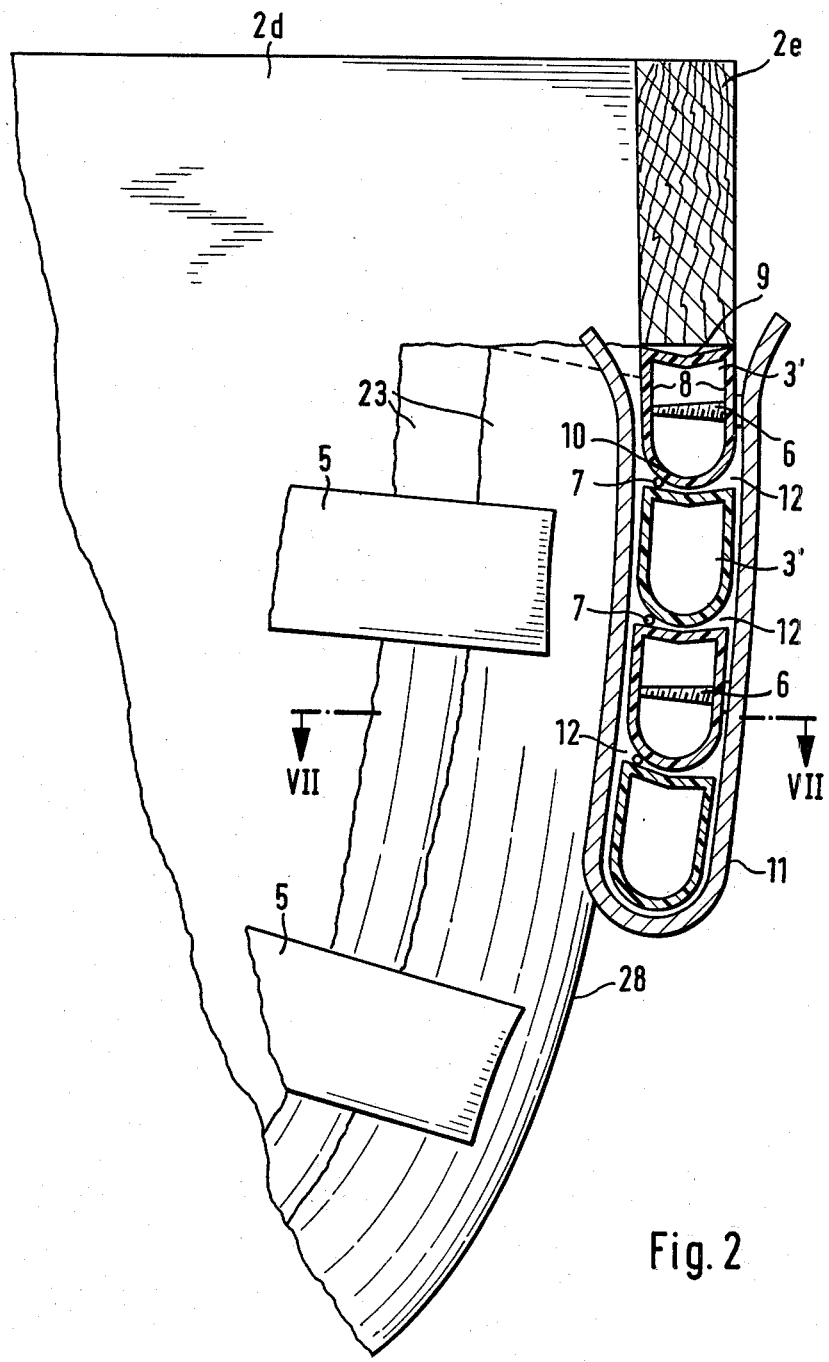
Figure 5A:
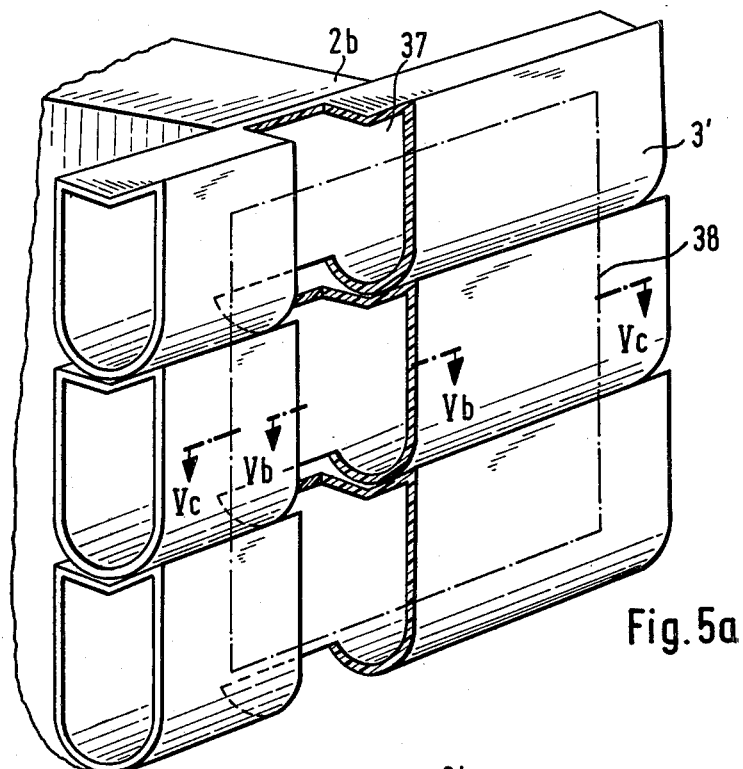
Figure 5B:
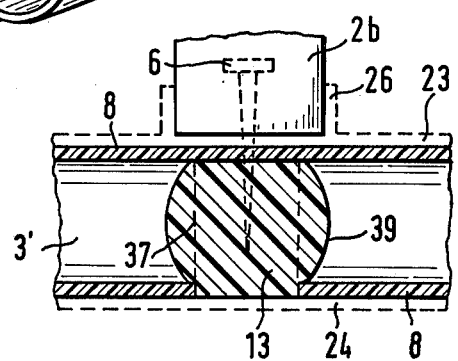
Figure 5C:
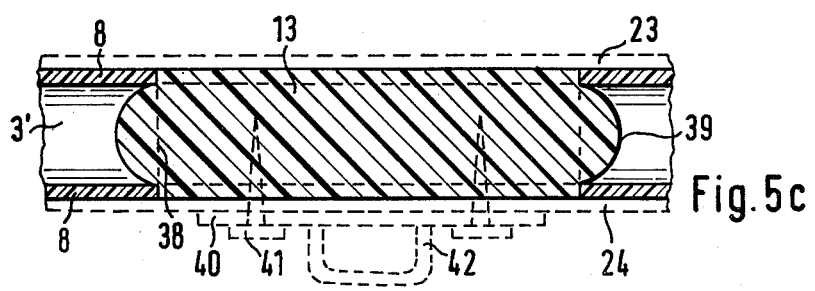
Figure 7:
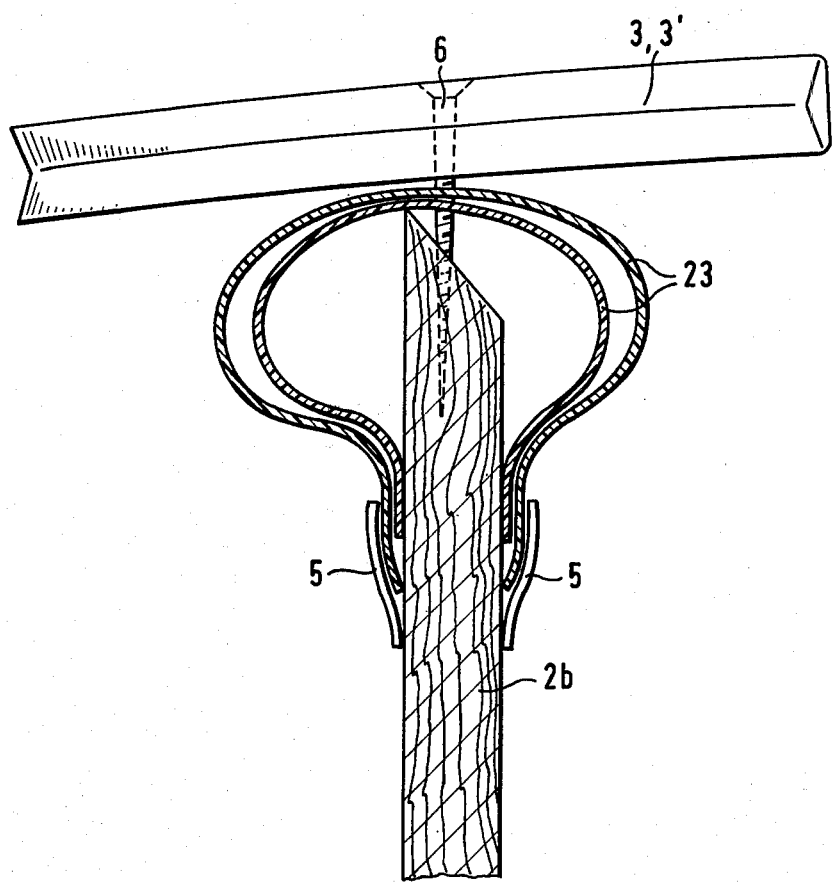
Figure 9:
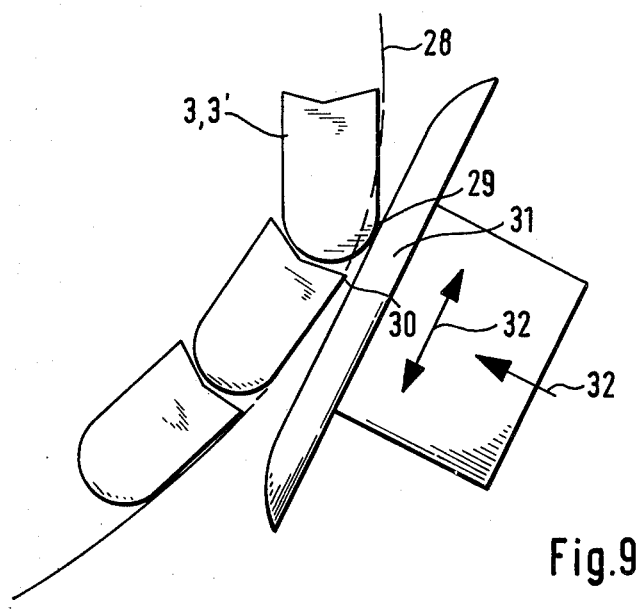
Figure 8:
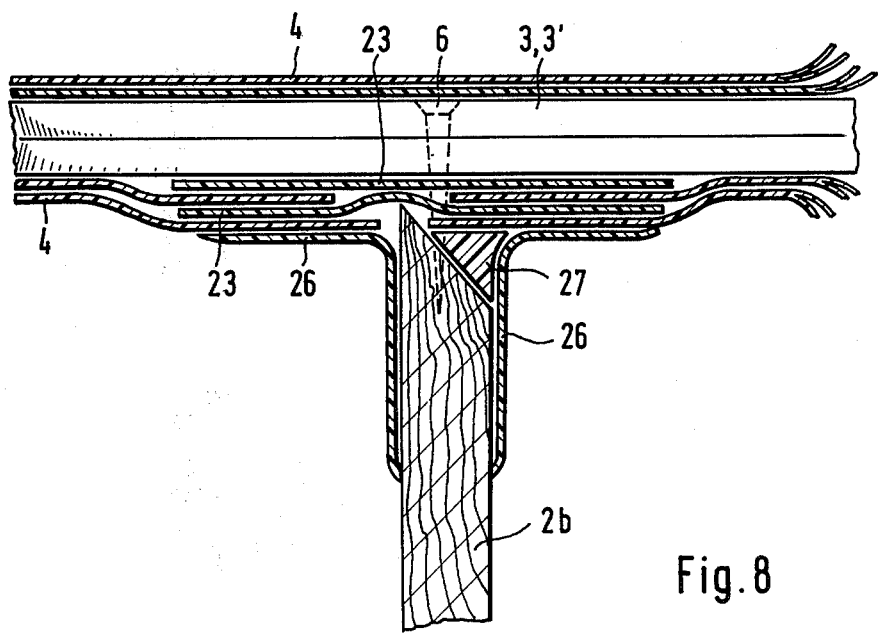
Figure 10:
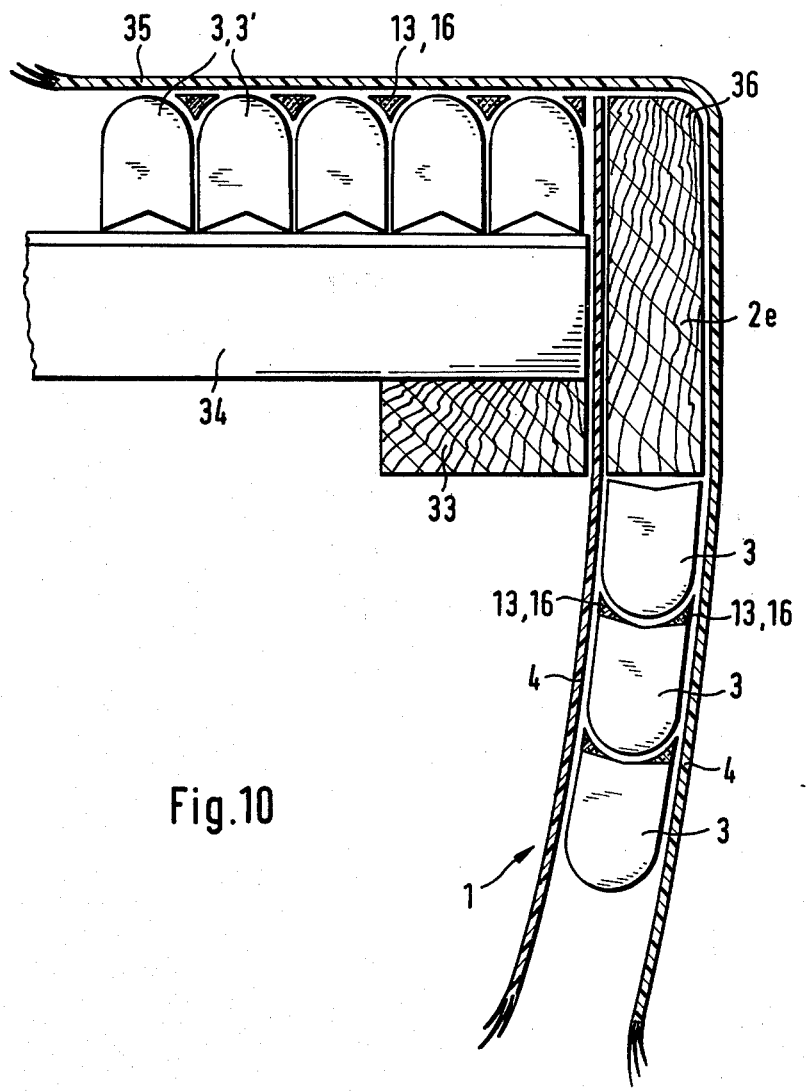

In the drawings:

FIG. 1 shows the assembly of a boat hull shell on a form frame,

FIG. 2 shows a portion of a sectional view taken along the line II—II in FIG. 1, FIG. 3 shows a further detail of FIG. 1, FIG. 4 shows a detail of the production method, FIG. 5 shows a further detail of the structures shown in the preceding figures, FIG. 5a shows a detail of a modified method for the construction of the boat hull shell, FIG. 5b shows a sectional view taken along the line Vb—Vb in FIG. 5a, FIG. 5c shows an alternative structural detail in a sectional view taken along the line Vc—Vc in FIG. 5a, FIG. 6 shows a further structural detail, FIG. 7 shows a top plan view of the detail shown in FIG. 2, FIG. 8 shows the performance of a method step proceeding from the detail shown in FIG. 7, FIG. 9 shows a further method step, and FIG. 10 shows a cross-sectional view of a portion of the finished boat hull.

At the beginning of the production or assembly method for making a boat hull shell 1, a form frame 2 is assembled. According to the inventive method, the form frame is assembled from structural elements functionally required in the finished boat. The form frame 2 shown in FIG. 1 comprises a stern bulkhead 2a, ribs 2b or transverse walls 2c, or bulkheads 2d, respectively, stringers 2e delimiting the rim of the boat hull shell to be assembled, a keel or keel beam 2f interconnecting the aforementioned elements, and a bow stem 2g determining the shape of the bows. The named elements are to determine the contours of the finished boat hull shell. Subsequently a plurality of elongate thermoplastic shapes are applied to the outsides of the named elements and interlocked with one another to form a basic shell, the inner and outer surfaces of which are finally covered with laminates 4 of fiber-reinforced thermosetting plastics materials subsequent to certain intervening steps to be described. FIG. 2 is a partial cross-section of FIG. 1, taken along the line II—II therein and showing a front view of a portion of the forward transverse wall 2d. Transverse wall 2d with its lateral edges determins the contour 28 of the finished boat hull shell. Below stringer 2e connected to transverse wall 2d, boat hull shell 1 is formed by placing thermoplastic tubular shapes 3' adjacent one another in an interlocking manner. Prior to this step, the edge portions of transverse wall 2d are covered with two strips 23 at least of a reinforcing fiber fabric usually employed for forming the reinforced thermosetting laminate, such strips 23 having a greater width than the thickness of the transverse wall and being temporarily affixed to transverse wall 2d by means of adhesive tape 5. Subsequently tubular shapes 3' are placed thereon and fastened at individual points by means of suitable fasteners such as bolts (or more precisely screws), nails, rivets 6 or the like. It is not necessary to fasten each shape 3' in this manner, it being sufficient to thus fasten every third or fourth shape. Subsequently an adhesive 7 is applied to sections of the abutting longitudinal sides of the shapes.

Shapes 3' are tubular shapes having uniform cross section. They have two substantially parallel sidewalls 8, connected along their upper ends by a shallow V-shaped channel 9 and along their lower edges by a U-shaped, rounded bottom wall 10. The cross-sectional configuration of tubular shapes 3' is of great importance for the boat hull shell 1 and the method for making same, as will be explained.

Placing tubular shapes 3' adjacent one another and fastening thereof to form frame 2 is considerably facilitated by the employ of U-shaped assembly clamps 11 having resilient legs readily deformable by bending. With the aid of such assembly clamps 11, individual tubular shapes are clamped together until they are fastened, or interconnected, respectively, at individual points by bolts 6, and at individual sections by means of adhesive 7, respectively. The adhesive employed hardens rapidly, so that assembly of the tubular shapes 3' may be carried out in a continuous operation.

The cross-sectional configuration of tubular shapes 3', which may of course also be formed as solid shapes, permits also strongly flared or curved portions of the boat hull shell to be formed in a simple manner, since the abutting bottom walls 10 and V-shaped channels 9 engage one anoter in the manner of a hinge. To this effect, the depth of V-shaped channels 9 is less than the height of U-shaped rounded bottom wall 10, so that in any case longitudinal, outwardly opening grooves 12 are formed between adjacent tubular shapes 3', said longitudinal grooves 12 being of fundamental importance for the subsequent process steps. Grooves 12 are present on the outside as well as on the inside of the boat hull shell.

FIG. 3 is a partial perspective view of a portion adjacent stern frame 2a, showing a further step in the method for producing boat hull shell 1. The shapes 3 employed in this case have a solid cross section and are placed adjacent one another in the manner described to form longitudinal grooves 12 therebetween.

After the lateral outsides of the form frame have now been completely covered with the shapes 3, so that these form a continuous covering on the form frame 2, the next process step is carried out by filling the longitudinal grooves 12 with a thermosetting or hardenable filler material 13 in such a manner that substantially smooth surfaces are obtained. The filler material 13 may be a per se known thermosetting or otherwise hardenable filler composition having thermal expansion characteristics similar to those of the shapes and the laminates 4 to be subsequently applied. Further the filler material 13 should be of a type adapted to be intimately bonded to the surfaces of shapes 3 as well as with the laminates 4 to be applied at a later stage. The filler material 13 filling longitudinal grooves 12 becomes set to form a stiffening, shape-retaining skeleton for the finished boat hull shell.

As further shown in FIG. 3, the shape-retaining properties or stiffness of the boat hull shell may be further improved by embossing channels 14 extending transversely i.e. perpendicularly or obliquely to the longitudinal direction of the shapes 3 by means of a heated embossing tool, one of said channels 14 being shown in FIG. 3. The transverse channels 14 are also filled with the filler material 13, so that in combination with the filler material 13 in longitudinal grooves 12, there is formed a stiffening skeleton in the boat hull shell, consisting of intersecting ribs or cords of the set filler material. This integrated stiffening skeleton greatly improves the resistance of the boat hull shell against impact loads, torsional and warp forces, and bending loads. In surface areas of the boat hull shell exposed to extreme loads, additional longitudinal channels 15 may be embossed, also by means of a heated embossing tool, said additional channels 15 to be also filled with the filler material in order to condense the network of stiffening ribs or cords in the boat hull. The transverse channels 14 as well as the additional longitudinal channels 15 may be provided at the outer and/or at the inner surface of the boat hull shell.

In the case of boat hull shells of larger dimensions, higher load resistance or desired improved shape-retaining properties, reinforcing material 16 may be embedded in the filler material 13 in grooves 12 and channels 14, 15. Reinforcing material 16 may consist of high tensile-strength carbon fibers, synthetic fibers, glass fibers, glass fiber rovings or of metals in the form of strips, wires, cords, rods, tubes, extrusions or the like. At intersection points, the reinforcing material 16 may be suitably interconnected e.g. intertwined, knotted, or interwoven. It is also possible to emboss grooves 12 and channels 14, 15 in the surface of the boat hull shell in accordance with a predetermined pattern and to embed the reinforcing material 16 in the filler material 13 in the form of prefabricated webs or nets. This embodiment constitutes a considerable simplification of the production method.

The tubular shapes 3' shown in FIG. 2 do not have to extend integrally over the entire length of the boat hull shell 1. They may rather, as shown in FIG. 4, be assembled from individual sections. To this effect, one end portion of an individual section is formed with a longitudinal slit 17 therein, compressed in the direction of arrows 18, coated with an adhesive, and introduced into the adjacent end of a further section in the direction of arrows 19. Connections of this type do not impair the overall strength of the boat hull shell. The sectioned shapes simplify stockpiling and may be assembled to any desired length.

As shown in FIG. 5, the transverse channels 14 may be embossed to such depth that the deformed sidewall 8 of the tubular shape abuts the non-deformed sidewall 8 thereof and is welded thereto in the contact area 20. This results in the formation of sealed chambers 21 in the longitudinal direction of the shapes contributing to the buoyancy of the finished boat hull shell and its resistance against mechanical damage. The bonding of sidewalls 8 in areas 20 may of course be facilitated by an adhesive applied to the interior surfaces of tubular shapes 3'.

A modified assembly step is shown in FIGS. 5a to 5c. The embossed channels are here replaced by openings milled or cut into the boat hull shell, or basic shell, respectively. These openings or cutouts may be in the form of channels or grooves 37 or have any other shape as shown by reference numeral 38. As depicted in FIGS. 5b and 5c, respectively, these cutouts 37, 38 may extend from one sidewall 8 to the opposite sidewall 8, or be formed by removing both sidewalls 8 of the tubular shapes, so that only the laminate 23 previously applied to one side thereof remains standing in the respective area. In both cases, thermosetting filler material 13 is introduced into the cutouts 37 or 38, such filler material forming domed projections 39 protruding into the tubular shapes 3 to become fixedly interlocked therewith. The rigid web or block of filler material formed in this manner serves to divide the cavities of the respective tubular shapes 3' into individually sealed chambers, for stiffening the boat hull shell, and for anchoring any elements to be attached to the boat hull shell. In FIG. 5b, cutout 37 is provided adjacent a transverse rib 2b which may be anchored in this area by means of bolt 6. The connection of the transverse rib with the boat hull shell is further improved by the formation of a joint connection 26 in the laminate. After filling with filler material 13, the opening 38 shown in FIG. 5c, if formed over a sufficient length, provides an extremely stiff integrated rib member. Opening 38, shown in dotted lines in FIG. 5a, may be used for anchoring a boat fitting 40 by means of screws 41, in which case the laminate 24 has to be applied prior to attaching the fitting 40. Through this fitting, which carries an attachment member 42, it is possible to introduce large forces into the boat hull, since the hardened filler material 13 is homogenuously bonded to laminate layers 23 and 24 and interlocked with the basic shell through domed projections 39. It is of course also possible to embed fitting 40 in the filler material 13 prior to its becoming set in such a manner that attachment member 42 projects through the outer laminate of the finished boat hull shell. Openings 37, 38 may of course be milled or cut into the basic shell from both sides thereof.

The cross-sectional configuration of shapes 3, 3' is shown in FIG. 6. Each shape 3, 3' comprises a channel 9' and a rounded bottom surface 10' offset to the same side of the symmetry axis 22. This cross-sectional configuration results in the formation of very pronounced longitudinal grooves 12' adapted to receive a great volume of filler material 13, with or without reinforcing material 16, for increasing the shape-retaining properties of the finished boat hull shell.

FIG. 7 shows a sectional view taken along the line VII—VII in FIG. 2 to depict the manner in which shapes 3, 3' are disposed adjacent the edge of transverse wall 2b. The edge of transverse wall 2b is chamfered to a wedge-shape, and the strips 23, as already stated, are temporarily attached by means of adhesive tape 5.

While FIG. 7 shows an earlier step in the formation of the boat hull shell, FIG. 8 depicts the same portion of the shell in its finished state. In FIG. 8 it is seen that the individual layers of the interior laminate 4 are bonded to strips 23 in an overlapping arrangement, so that a continuous laminate covering is also formed on the interior surface of the basic shell formed by shapes 3, 3'. In addition, a force-transmitting connection is formed between transverse wall 2b and the basic shell by applying a filler strip 27 of triangular cross section, preferably also formed of a thermosetting or hardenable plastics material, to the chamfered edge portion, and by bonding corner strips 26 of reinforcing fiber material to the interior corners formed at both sides of the abutment between transverse wall 2b and the shell, one leg of said corner strips 26 being bonded to the surface of transverse wall 2b, and the other, to the overlapping portions of laminate 4 and strips 23. This also seals the attachment area of transverse wall 2b, so that the latter may serve as a transverse bulkhead in the finished boat hull.

In areas of pronounced curvature of the boat's walls under construction, the juxtaposed shapes 3, 3' may form a fluted surface having raised portions 29, 30. Since it may not be possible to level this surface by means of the subsequently applied laminate, the raised portions 29, 30 may be flattened prior to filling the longitudinal grooves 12 by softening the thermoplastic material of shapes 3, 3' with the aid of a heated flatiron 31 and dislocating it by moving flatiron 31 in the direction of arrows 32, see FIG. 9. This step permits to adapt the outer surface of the basic shell exactly to the desired contour 28 of the finished boat hull.

FIG. 10 finally shows the manner in which a deck structure is joined to basic shell 1. To this effect, a shelf 33 is affixed to stringer 2e to serve as a support for deck beams 34. On deck beams 34, shapes 3, 3' are placed in side-by-side relation, the resulting longitudinal grooves are filled with filler material 13 and, if desired, reinforcing material 16, and the resulting structure is covered with a deck laminate 35 which may also consist of a fiber-reinforced thermosetting plastics material. Particularly along the deck's edge 36 which is subjected to substantial forces, the arrangement is such that the outer laminate 4 of the basic shell 1 extends continuously into the laminate 35 of the deck structure.

The form frame 2 shown in FIG. 1, consisting of structural elements to be integrated in the finished boat hull, may of course be replaced by a form frame in the form of a positive core or a negative shell, which is removed after completion of the basic shell 1 for repeated use. In cases in which such form cores or form shells are employed, the assembly is started by forming the basic shell with its stiffening skeleton from shapes 3, 3' and covering the accessible surface of the shell with the laminate. After the laminate has become set, the form core or form shell is removed, so that the other surface may be filled, stiffened and laminated. If further structural elements are to be installed in the so-formed "raw" boat hull shell, they may be operatively and sealingly connected therewith in the manner shown in FIGS. 7 and 8.

If tubular shapes 3' are employed, the ends thereof at the stem and stern portions are closed with filler material prior to applying the laminates, so that in case of damage to these portions, water is prevented from penetrating into the tubular shapes, and the shapes are considerably stiffened at these portions.

The laminates are applied in accordance with conventional techniques, such as by hot rolling, application by hand, or fiber spraying, employing conventional boatbuilding materials, particularly glass fiber reinforced polyester resins.

The intermediate step of levelling uneven areas by means of a flatiron is usually required only if shapes having a very large cross section are employed or in areas of very strong curvature of the boat hull shell. Normally a very even and smooth surface is obtained by the application of the filler material, so that hot pressing is not necessary.

The above-described method offers the remarkable advantage that it enables even laymen to build their own boats of any desired size and design with the aid of simple building plans and instructions. Boats, particularly sailboats of the described construction have shown the remarkable advantage that the boat hull shells at a given size and water displacement are considerably lighter than those of conventional construction, so that, at a similar final weight, they may be equipped with a correspondingly heavier ballast keel than other boats in the same weight and measurement class. Heavier keel weights, however, result in a greatly improved position of the centre of gravity, so that sailboats of this construction are able to absorb higher wind forces at a reduced list or may attain higher speeds than other boats of comparable size due to reduced draught and a smaller submerged surface area.

I claim:

1. Self-supporting plastic shell structure, in particular a multilayered boat hull shell, formed of elongate thermoplastic shapes placed in contact one against another to form a basic shell and covered with laminates of fiber-reinforced hardenable plastics material, comprised by the improvement wherein:

the shapes forming the basic shell are flexible and of uniform cross section and form outwardly opening longitudinal grooves therebetween along their areas of mutual contact, the contacting top and bottom ends of the cross sections of adjacent shapes being configured to rest one within the other but being noncomplementary in in configuration and free of snap-fit relation, a said shape having spaced opposed sidewalls, a said top end which is a shallow V-cross section top wall connecting said sidewalls and forming a channel, and a said bottom end which is a convexly rounded bottom wall connecting said sidewalls, the convexly rounded bottom wall of one shape contacting the V-cross section top wall of the next shape and being engageable simultaneously with both ramps of said shallow V-cross section top wall through a range of angles corresponding to the angle between said ramps of said shallow V-cross section top wall;

a thermosetting or hardenable filler material filling said longitudinal grooves, said laminate covering side surfaces of said shapes and intervening filler material.

2. A boat hull shell according to claim 1 in which the height of the rounded bottom wall is greater than the depth of the V-cross section channel.

3. A boat hull shell according to claim 1 in which the channel and bottom wall are laterally offset to one side of the symmetry axis of the shapes cross section.

4. Self-supporting plastic shell structure, in particular a multilayered boat hull shell, formed of elongate thermoplastic shapes placed adjacent one another in an interlocking manner to form a basic shell and covered with laminates of fiber-reinforced hardenable plastics material, comprised by the improvement wherein:

the shapes forming the basic shell are flexible and of uniform cross section and form outwardly opening longitudinal grooves along their areas of mutual contacts;

a thermosetting or hardenable filler material filling said longitudinal grooves;

channels extending transversely to the direction of the longitudinal grooves, said channels being embossed in the surfaces of the basic shell, the channels being filled with a hardenable filler material, the so formed surfaces of the basic shell being covered with said laminates.

5. A boat hull shell according to claim 4, including additional channels extending parallel to the longitudinal grooves and embossed in the surface of the basic shell, said grooves and channels being filled with said hardenable filler material, the so formed surfaces being covered with said laminates.

6. A boat hull shell according to claim 4 in which the filler material filling said grooves and channels has a reinforcing material embedded therein.

7. A boat hull shell according to claim 6 in which said reinforcing material is arranged in an intersecting pattern.

8. A boat hull shell according to claim 7 in which said reinforcing material is intertwined at its points of intersection.

9. A boat hull shell according to claim 7 in which said reinforcing material is knotted at its points of intersection.

10. A boat hull shell according to claim 7 in which said reinforcing material is interwoven at its points of intersection.

11. Self-supporting plastic shell structure, in particular a multilayered boat hull shell, formed of elongate thermoplastic shapes placed adjacent one another in an interlocking manner to form the basic shell and covered with laminates of fiber-reinforced hardenable plastics material, comprised by the improvement wherein:
the shapes forming the basic shell are flexible and of uniform cross section and form outwardly opening longitudinal grooves along their areas of mutual contact;
a thermosetting or hardenable filler material filling said longitudinal grooves;
openings in the form of flutes, grooves, or channels, or recessed areas and extending from one wall of said shapes to the opposite wall thereof, said openings being filled with a hardenable filler material and covered with said laminates at the surface of the basic shell.

12. A boat hull shell according to claim 11 in which said openings extend through both walls of said shapes, said openings being filled with said filler material and covered with said laminates at both surfaces of the basic shell.

13. A method for producing a self-supporting plastic shell, in particular a multilayered boat hull shell, with the aid of a form frame determining the final hull form, comprising steps of:
providing a plurality of elongate thermoplastic shapes which are flexible and of uniform cross section, but with noncomplementary cross section opposable top and bottom walls in which a said shape has two substantially parallel sidewalls, a shallow V-shaped channel top wall connecting the upper edges of said sidewalls and a U-shaped rounded bottom wall connecting the lower edges of said sidewalls;
placing said elongate thermoplastic shapes on said form frame with their opposable walls interengaging one another and in laterally adjustable contact including engaging the convexly rounded bottom wall of one shape with the shallow V-shaped channel of the adjacent shape, and engaging one sidewall surface of said shapes with the form frame and forming outwardly opening longitudinal grooves along the interengaged longitudinal sides of mutually contacting shapes, and affixing said shapes to said form frame at individual points to form a basic shell;
filling said longitudinal grooves with a hardenable filler material;
covering said basic shell and filler material with laminates of fiber-reinforced hardenable plastics material.

14. A method according to claim 13, in which the form frame comprises a reusable form member and including subsequent removal of said form member from the shell.

15. A method according to claim 13 including leveling uneven areas formed on the surfaces of the basic shell by hot pressing prior to filling said grooves.

16. A method according to claim 13 in which said form frame includes stringers delimiting the rim of the boat hull to be assembled, the steps in mounting a deck structure adjacent said stringers comprising juxtaposing shapes to form said deck structure and covering said shapes by a laminate, and extending the laminate of the lower portion of the boat hull shell continuously into the laminate of the deck structure.

17. A method for producing a self-supporting plastics shell, in particular a multilayered boat hull shell, with the aid of a form frame determining the final hull form, comprising the steps of:
providing a plurality of elongate thermoplastic shapes which are flexible and of uniform cross section;
placing said elongate theremoplastic shapes on said form frame with their longitudinal sides interengaging one another and for forming outwardly opening longitudinal grooves along the interengaged longitudinal sides of mutually contacting shapes, and affixing said shapes to said form frame at individual points to form a basic shell;
filling said longitudinal grooves with a hardenable filler material;
covering said basic shell and filler with laminates of fiber-reinforced hardenable plastics material; and
prior to filling said longitudinal grooves, the step of embossing the surfaces of the basic shell with a plurality of channels extending transversely to the longitudinal direction of said shapes by means of a heated pressing tool, and subsequently filling both the grooves and channels with said hardenable filler material.

18. A method according to claim 17 including embossing longitudinal channels in said shapes, and simultaneously filling said grooves and channels with said hardenable filler material.

19. A method for producing a self-supporting plastics shell, in particular a multilayered boat hull shell, with the aid of a form frame determining the final hull form, comprising the steps of:
providing a plurality of elongate thermoplastic shapes which are flexible and of uniform cross section;
placing said elongate thermoplastic shapes on said form frame with their longitudinal sides interengaging one another and for forming outwardly opening longitudinal grooves along the interengaged longitudinal sides of mutually contacting shapes, and affixing said shapes to said form frame at individual points to form a basic shell;
filling said longitudinal grooves with a hardenable filler material;
covering said basic shell and filler with laminates of fiber-reinforced hardenable plastics material; and
cutting or milling the surface of the basic shell at least down to the opposite wall of said shapes, and filling the so formed cutouts with said hardenable filler material prior to applying the covering laminates.

20. A method according to claim 19, including applying a laminate to one surface of the basic shell, subsequently removing both walls of said shapes by carrying out said milling or cutting step from the opposite surface, and thereafter carrying out the said steps of filling the so formed cutout with filler material and covering same with laminate.

21. A method for producing a self-supporting plastic shell, in particular a multilayered boat hull shell, with the aid of a form frame determining the final hull form, comprising steps of:
providing a plurality of elongate thermoplastic shapes which are flexible and of uniform cross section, but with noncomplementary cross section opposable top and bottom walls;
placing said elongate thermoplastic shapes on said form frame with their opposable walls interengaging one another and in laterally adjustable, both pivotal and slidable, contact, and for forming outwardly opening longitudinal grooves along the interengaged longitudinal sides of mutually contacting shapes, and affixing said shapes to said form frame at individual points to form a basic shell;
filling said longitudinal grooves with a hardenable filler material;
covering said basic shell and filler material with laminates of fiber-reinforced hardenable plastics material; and
prior to filling said longitudinal grooves, the step of relieving a longitudinally localized portion of the surface of said basic shell between adjacent longitudinal grooves and filling the grooves and reliefs with hardenable filler material having embedded therein reinforcing fibers of high tensile strength.

22. A method for producing a self-supporting plastic shell, in particular a multilayered boat hull shell, with the aid of a form frame determining the final hull form, comprising steps of:
providing a plurality of elongate thermoplastic shapes which are flexible and of uniform cross section, but with noncomplementary cross section opposable top and bottom walls;
placing said elongate thermoplastic shapes on said form frame with their opposable walls interengaging one another and in laterally adjustable, both pivotal and slidable, contact, and for forming outwardly opening longitudinal grooves along the interengaged longitudinal sides of mutually contacting shapes, and affixing said shapes to said form frame at individual points to form a basic shell;
filling said longitudinal grooves with a hardenable filler material;
covering said basic shell and filler material with laminates of fiber-reinforced hardenable plastics material; and
prior to filling said longitudinal grooves, the step of relieving a longitudinally localized portion of the surface of said basic shell between adjacent longitudinal grooves and filling the grooves and reliefs with hardenable filler material having embedded therein reinforcing material in the form of elongate metal members.

23. A method for producing a self-supporting plastic shell, in particular a multilayered boat hull shell, with the aid of a form frame determining the final hull form, comprising steps of:
providing a plurality of elongate thermoplastic shapes which are flexible and of uniform cross section, but with noncomplementary cross section opposable top and bottom walls, the shapes employed being extruded tubular shapes, and including dividing the shapes into individual separate chambers by embossing at least one of transverse and longitudinal channels therein;
placing said elongate thermoplastic shapes on said form frame with their opposable walls interengaging one another and in laterally adjustable, both pivotal and slidable, contact, and for forming outwardly opening longitudinal grooves along the interengaged longitudinal sides of mutually contacting shapes, and affixing said shapes to said form frame at individual points to form a basic shell;
filling said longitudinal grooves with a hardenable filler material;
covering said basic shell and filler material with laminates of fiber-reinforced hardenable plastics material.

24. A method for producing a self-supporting plastic shell, in particular a multilayered boat hull shell, with the aid of a form frame determining the final hull form, comprising steps of:
providing a plurality of elongate thermoplastic shapes which are flexible and of uniform cross section, but with noncomplementary cross section opposable top and bottom walls;
placing said elongate thermoplastic shapes on said form frame with their opposable walls interengaging one another and in laterally adjustable, both pivotal and slidable, contact, and for forming outwardly opening longitudinal grooves along the interengaged longitudinal sides of mutually contacting shapes, and affixing said shapes to said form frame at individual points to form a basic shell;
filling said longitudinal grooves with a hardenable filler material, the shapes being tubular, and including dividing the shapes into separate individually sealed chambers by filling openings through the wall of the shapes with filler material;
covering said basic shell and filler material with laminates of fiber-reinforced hardenable plastics material.

25. A method for producing a self-supporting plastics shell, in particular a multilayered boat hull shell, with the aid of a form frame determining the final hull form, comprising the steps of:
providing a plurality of elongate thermoplastic shapes which are flexible and of uniform cross section;
placing said elongate thermoplastic shapes on said form frame with their longitudinal sides interengaging one another for forming outwardly opening longitudinal grooves along the interengaged longitudinal sides of mutually contacting shapes, and affixing said shapes to said form frame at individual points to form a basic shell;
filling said longitudinal grooves with a hardenable filler material;
covering said basic shell and filler with laminates of fiber-reinforced hardenable plastics material; and
assembling the thermoplastic shapes from individual sections in the longitudinal direction by providing at least one longitudinal slit in one end portion of a section, compressing said end portion along the extent of said slit, applying an adhesive to said end portion, and introducing it into an end of an adjacent section.

26. A method for producing a self-supporting plastics shell, in particular a multilayered boat hull shell, with the aid of a form frame determining the final hull form, comprising the steps of:

providing a plurality of elongate thermoplastic shapes which are flexible and of uniform cross section;

placing said elongate thermoplastic shapes on said form frame with their longitudinal sides interengaging one another and for forming outwardly opening longitudinal grooves along the interengaged longitudinal sides of mutually contacting shapes, and affixing said shapes to said form frame at individual points to form a basic shell;

filling said longitudinal grooves with a hardenable filler material;

covering said basic shell and filler with laminates of fiber-reinforced hardenable plastics material; and as part of said placing step, clamping at least one of said shapes at a time to adjacent and already affixed shapes by means of at least one U-shaped assembly clamp adapted to be bent to the contour of that portion of the form frame to which the respective shape is to be attached, and including fixing the clamped shape at selected points thereon with respect to at least one of the form frame and the adjacent shape, before the assembly clamps are removed.

27. A method for producing a self-supporting plastic shell, in particular a multilayered boat hull shell, with the aid of a form frame determining the final hull form, comprising the steps of:

constructing the form frame of structural elements to be integrated with the finished boat hull shell;

providing a plurality of elongate thermoplastic shapes which are flexible and of uniform cross section;

placing said elongate thermoplastic shapes on said form frame with their longitudinal sides interengaging one another and for forming outwardly opening longitudinal grooves along the interengaged longitudinal sides of mutually contacting shapes, with said shapes arranged on said form frame to form a basic shell;

connecting said structural elements in a force-transmitting manner to the basic shell at areas of mutual contact by locating cutouts for openings in the shapes at areas of the basic shell at which said structural elements are to be connected, filling said cutouts or openings with filler material, and connecting said structural elements with fasteners to said basic shell at these areas;

filling said longitudinal grooves with a hardenable filler material;

covering said basic shell and filler with laminates of fiber-reinforced hardenable plastics material.

28. A method for producing a self-supporting plastic shell, in particular a multilayered boat hull shell, with the aid of a form frame determining the final hull form, comprising the steps of:

constructing the form frame of structural elements to be integrated with the finished boat hull shell;

providing a plurality of elongate thermoplastic shapes which are flexible and of uniform cross section;

placing said elongate thermoplastic shapes on said form frame with their longitudinal sides interengaging one another and for forming outwardly opening longitudinal grooves along the interengaged longitudinal sides of mutually contacting shapes, said shapes being arranged on said form frame to form a basic shell;

connecting said structural elements in a force-transmitting manner to the basic shell at areas of mutual contact by covering the edge portions of the form frame elements coming into contact with the basic shell with at least two strips of fiber-reinforcing material, extending said strips beyond the width of said edge portions at both sides thereof and temporarily affixing said strips to said form frame, and during application of the laminate to the interior surface of the basic shell, laying down said strips on said interior surface to be mounted to said laminate, or layers thereof, respectively in an overlapping manner, and finally bending corner strips of reinforcing material into the so formed inside corners;

filling said longitudinal grooves with hardenable filler material;

covering said basic shell and filler with laminates of fiber-reinforced hardenable plastics material.

* * * * *